United States Patent [19]

Joynt et al.

[11] Patent Number: 5,447,437
[45] Date of Patent: Sep. 5, 1995

[54] PORTABLE FIREFIGHTER TRAINING SYSTEM FOR FIRE EXTINGUISHING TRAINING

[76] Inventors: David M. Joynt, 2015 Copperwood Way, Fallston, Md. 21047; Robert F. Debrody, 225 Overbrook Rd., Baltimore, Md. 21212; Eddis M. Phillips, 405 Lakevista Cir., Apt. A., Cockeysville, Md. 21030; August A. Zachmeier, 308 Foster Knoll Dr., Joppa, Md. 21085; Donald C. Wright, 620 Carvel Grove Rd., Baltimore, Md. 21221

[21] Appl. No.: 296,860

[22] Filed: Aug. 26, 1994

Related U.S. Application Data

[63] Continuation of Ser. No. 852,066, Mar. 16, 1992, abandoned.

[51] Int. Cl.[6] .................................................. G09B 9/00
[52] U.S. Cl. .................................................... 434/226
[58] Field of Search ................. 434/226, 219, 365, 382

[56] References Cited

U.S. PATENT DOCUMENTS

| | | |
|---|---|---|
| 3,675,342 | 7/1972 | Wolff . |
| 3,675,343 | 7/1972 | Swiatosz et al. . |
| 4,001,949 | 1/1977 | Francis . |
| 4,303,396 | 12/1981 | Swiatosz . |
| 4,526,548 | 7/1985 | Livingston . |
| 4,861,270 | 8/1989 | Ernst et al. . |
| 4,983,124 | 1/1991 | Ernst et al. . |
| 5,052,933 | 10/1991 | Rogers et al. ........................ 434/226 |

OTHER PUBLICATIONS

"Live Hands-On Demonstration", *The Voice*, vol. 21, No. 4, p. 49 (Apr. 1992).
Brochure, "Portable Live Fire Training System", Symtron Systems, Inc. (undated).
"Trainer Engineering Report CDRL Item A00B For Device 19F1A Advanced Fire Fighting Surface Ship Trainer (Preliminary)", Austin Electronics, Jan. 6, 1988.
E. Swiatosz, et al., "New Developments In Navy Fire Fighter Trainers", *Proceedings of the 1st Interservice/Industry Training Equipment Conference*, Nov. 1979, pp. 217–227.
S. Sansone and S. Aroneo, "New Fire Simulator at FDNY Training Academy", *W.N.Y.F.* (With New York Firefighters), vol. 48, 2nd Issue, 1987, pp. 8–11.

*Primary Examiner*—Richard J. Apley
*Assistant Examiner*—John P. Leubecker
*Attorney, Agent, or Firm*—Venable, Baetjer, Howard & Civiletti

[57] ABSTRACT

A portable firefighting training system is provided that is useful in educating people as to proper firefighting procedures using self-contained supplies of fire extinguishing agents such as fire extinguishers and the like. Class A, B or C fires can be simulated through the use of a portable burner assembly and interchangeable mock-ups simulating burning structures.

16 Claims, 5 Drawing Sheets

PORTABLE FIREFIGHTER TRAINING SYSTEM FOR FIRE EXTINGUISHING TRAINING

This is a continuation of application Ser. No. 07/852,066, filed 16 Mar. 1992, now abandoned.

BACKGROUND OF THE INVENTION

The invention relates generally to firefighter training systems, and more particularly to gas fueled firefighter training systems that are operable to simulate a variety of different classes of fires.

Conventional firefighter training practices typically provide for the combustion of flammable materials, such as wood, straw, and other organic and inorganic materials, which are to be extinguished by the trainee upon the application of sufficient quantities of an appropriate fire extinguishing agent. However, these conventional training practices have come under scrunity in recent years as a result of the relatively high injury rate, adverse environmental impact, and limited training effectiveness and trainee throughput that is associated with such practices. For example, the National Fire Protection Association (NFPA) reports that in the United States alone, nearly 6,000 training-related injuries were sustained by firefighters in 1988. Nevertheless, live fire training is a crucial and necessary component of firefighter training, for it most closely represents the overall environment a firefighter is likely to encounter during a genuine fire emergency. Unfortunately, conventional live fires that are set for the purpose of firefighter trainee education suffer from many of the very same hazards that are associated with genuine fire emergencies—unpredictability of fire propagation and its response to trainee action. As a consequence of these characteristics, it is often necessary for the trainee supervisors to themselves suppress the live fire prior to rendering perhaps life-saving assistance to a fallen trainee. Furthermore, because the very nature of a conventional live fire is unpredictability, it is not possible to accurately and readily reproduce a desired fire condition for a succession of firefighter trainees.

In an effort to address the foregoing deficiencies in firefighter training, live fire simulator systems have been implemented since the early 1970s which provide for, among other features, the substitution of various controllable arrangements of propane-fueled burners located within dedicated "burn rooms" for the prior practice of igniting various flammable props such as wood and straw bundles. However, these prior live fire simulator systems have been of such a scale as to inhibit effective fire suppression training for nearly all but large scale fires. Further, because of the size and complexity of such simulator systems, their installation is generally limited to permanently situated burn facilities. Accordingly, the benefits afforded by such live fire training have been limited to the relatively small numbers of trainees that have been able to personally visit these simulator systems.

The advantages in training both professional firefighters and other personnel such as instructors, factory workers and the like in suppressing relatively small fires have also been recognized since, if left unattended or improperly managed, these fires can lead to much larger scale fires that are commensurately more difficult to control.

One effort to train personnel as to the techniques for suppressing relatively small fires with fire extinguishers and the like is disclosed in U.S. Pat. No. 4,001,949. This patent discloses methods and apparatus for simulating fires and for evaluating trainee performance in suppressing simulated fires in accordance with a predetermined firefighting sequence. The trainer includes a video projection screen onto which the image of a simulated fire is projected, a modified $CO_2$ extinguisher for producing a gas cloud representative of the release of conventional fire extinguishing agent dry chemicals, and electrical signal processing apparatus associated with the projection screen to provide an indication of extinguishing agent application to the simulated fire. All of the trainer components are housed within a mobile trailer. While this system provides the advantages of small fire suppression training in a portable facility, the facility is large and complex, and provides only a visual simulation of a fire rather than a genuine fire with flames and heat. Accordingly, many of the benefits and realism associated with live fire training are not provided with the trainer disclosed in this patent.

In view of the foregoing limitations in known firefighter training systems, there exists a need for a live fire firefighter trainer that allows for instruction as to the suppression of various classes of fires with conventional fire extinguisher equipment and which is readily affordable and transportable to allow for the training of relatively large numbers of professional firefighters and other personnel.

SUMMARY OF THE INVENTION

The portable firefighter training system of the present invention overcomes the deficiencies noted above with respect to existing firefighter trainers by providing a readily transportable, comparatively light-weight system that is operable to simulate Class A, B and C fires with genuine heat and flames for fire extinguishment training of various personnel using genuine or simulated fire extinguishing agents. Accordingly, training realism is enhanced, resulting in more educational and informative training exercises. Further, due to the simplicity and modest cost of the present trainer, it can be acquired and utilized by a wide variety of users, including not only municipal fire departments and other professional firefighting organizations, but also public and private educational institutions, businesses, and the like.

In one aspect of the invention, a portable firefighter training system is provided that includes a portable fuel burner unit for receiving a supply of fuel from a storage tank, a fuel ignition system that is operable to ignite fuel supplied to the burner unit to generate a fire, and a portable trainer control console operable to govern the progress of a training scenario. The control console receives signal input from a sensor system that is operable to detect fuel combustion at the burner unit. Fuel is selectively enabled and disabled in accordance with the signal input received from the sensor system. The fuel ignition system can include a spark igniter or a pilot flame. A fire extinguishing agent can be applied to the fire to extinguish it in accordance with prescribed extinguishment techniques. Preferred extinguishing agents include $CO_2$, water, aqueous film forming foam (AFFF), sodium bicarbonate and other powdered extinguishing agents, and suitable biodegradable fire extinguishing agents, along with simulated powder and foam extinguishing agents.

A variety of different mock-ups of structures can be associated with the burner unit to enhance realism of the training exercise by simulating Class A, B and C fire environments. The mock-ups are preferably interchangeably mountable to the burner unit to allow for expedient changes in the class of fire to be simulated for a given training exercise. Examples of mock-ups include simulated wastebaskets for Class A fires and electric motor housings for simulating Class C electrical fires.

The invention also provides a method for training various personnel to suppress fires with a portable supply of a fire extinguishing agent. The method includes the steps of providing a portable fuel burner system and a supply of fuel to the burner system, igniting the fuel supplied to the burner system to produce a fire which emanates from the burner system, and applying a fire extinguishing agent to the fire from the portable extinguishing agent supply. The extinguishing agent is preferably applied in sufficient quantity and in an appropriate manner to extinguish the fire at the burner system. Once the fire is extinguished, the supply of fuel to the burner system is terminated. The termination of the fuel supply can be accomplished through the use of a suitable flame or heat sensing apparatus whose output is directed to a fuel flow control device such as a solenoid valve mounted in the fuel supply line. Upon detection of fire extinguishment or a decrease in fire size below a predetermined threshold level, the solenoid is actuated to close off the supply of fuel to the burner system.

BRIEF DESCRIPTION OF THE DRAWINGS

Further features and advantages of the present invention will become apparent from a reading of the following specification in conjunction with the accompanying drawings, in which.

DETAILED DESCRIPTION OF THE PREFERRED EMBODIMENTS

Figure 1:
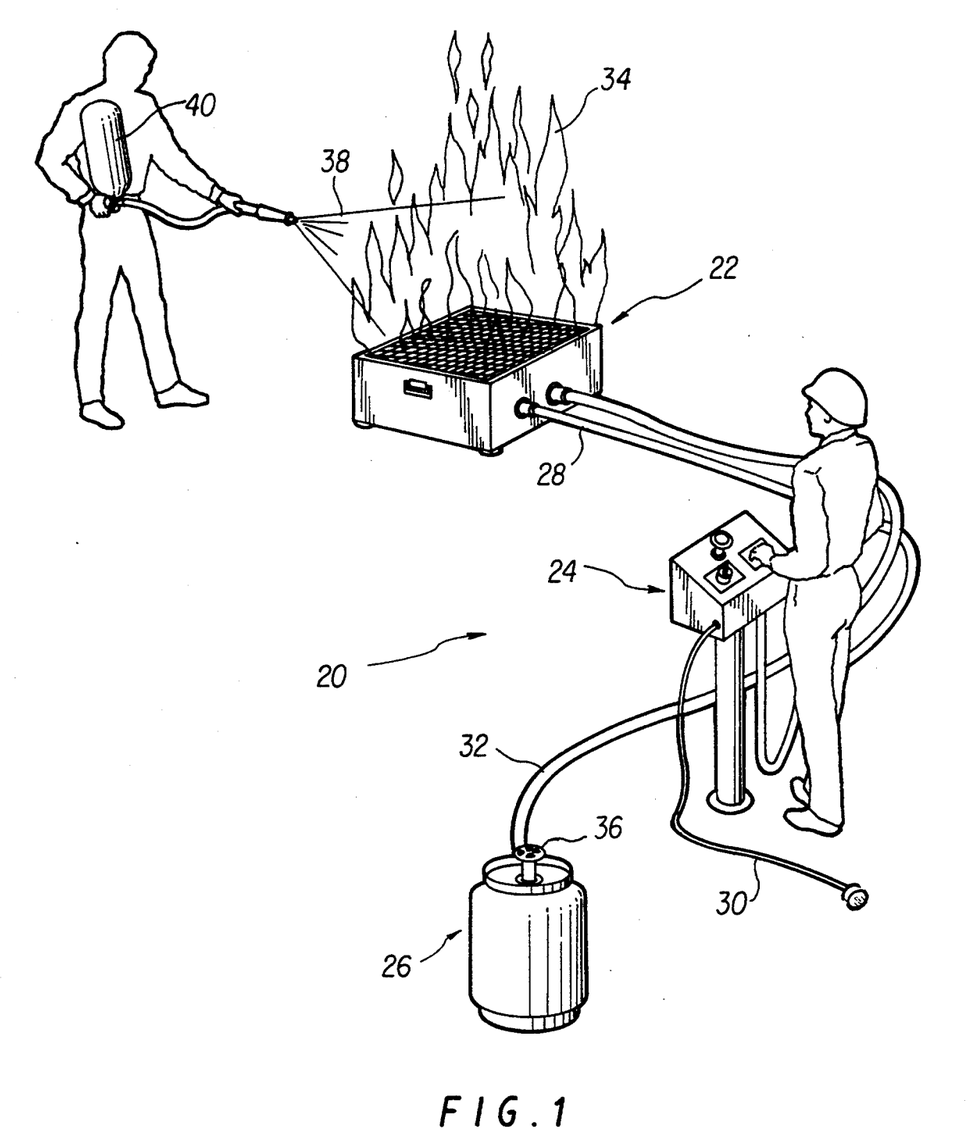
FIG. 1 is a perspective view of a portable firefighter training system in use.

With reference to the drawings, wherein like reference characters correspond to like parts through the various views, and with particular reference to FIG. 1, there is depicted a portable firefighter training system in accordance with the present invention, designated generally by reference character 20. The firefighter training system 20 includes a portable burner unit 22, a control console 24 positionable remotely from the burner unit 22, and a fuel supply tank 26. The control console 24 provides for the control of burner unit operation in the manner described below through one or more electrical cables 28. While the console can be powered by an appropriate self-contained power source such as a battery, it can alternatively be powered through a power cord 30. Fuel is selectively supplied to the burner unit 22 through a fuel supply line 32, where it can be ignited to produce a fire representative of a Class A, B, or C fire. The fuel supply tank 26 can be in the form of a conventional 20 lb. or 30 lb. propane tank of the type commonly used for fueling portable grills and the like. General control over fuel flow from the tank 26 to the fuel supply line 32 is provided by an associated rotary-controlled valve 36 and pressure regulator. The fire 34 can be suppressed, and preferably extinguished, by an extinguishing agent 38 that is supplied from a fire extinguisher 40 or other suitable, preferably portable, self-contained supply of fire extinguishing agent.

Figure 2:
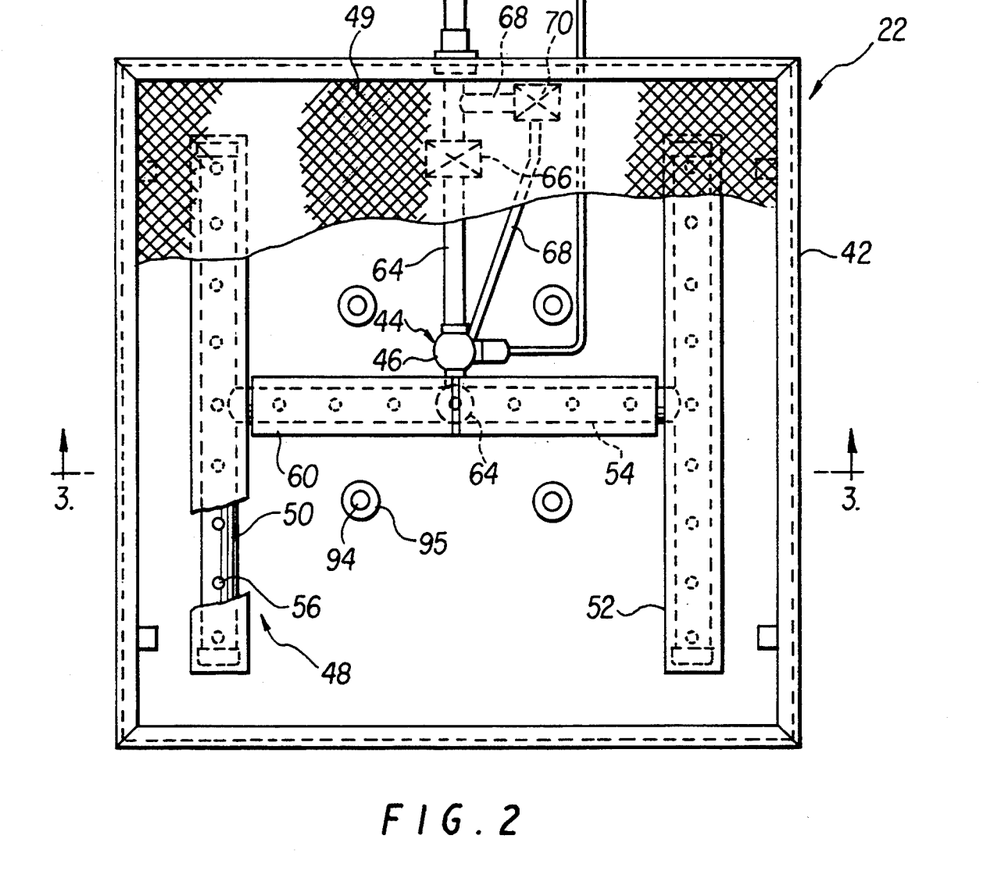
FIG. 2 is an overhead, partially cut-away away view of the burner unit depicted in FIG. 1.
Figure 3:
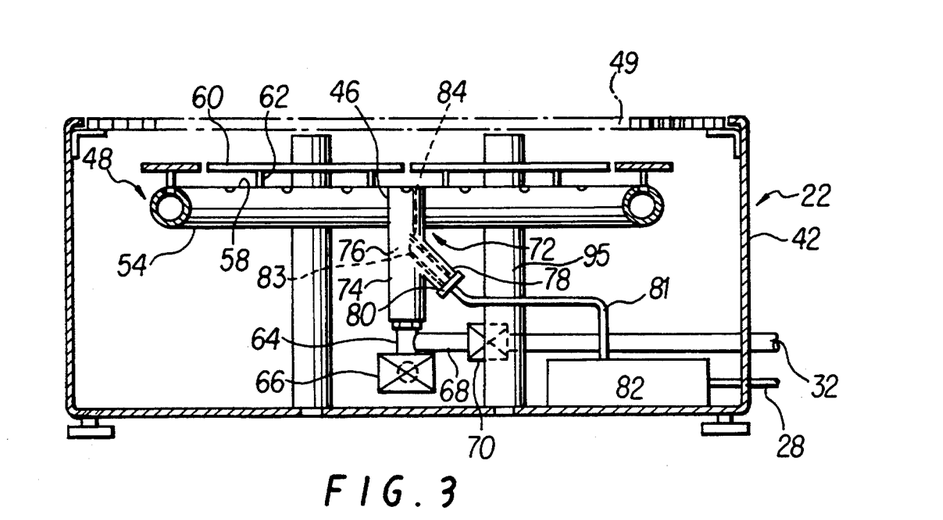
FIG. 3 is a view along the line 3—3 of FIG. 2.

Details of the burner unit are provided in FIGS. 2 and 3. With reference to these drawings, the burner unit 22 includes a housing 42 within which is received a burner array 44 that includes a centrally positioned spot or point burner 46 and a larger, generally H-shaped burner 48. The burner array 44 is mounted beneath a perforated platform 49 or grating which provides an outlet for the flame. The depicted H-shaped burner 48 includes two generally parallel tubular elements 50 and 52 which are joined to one another by a transversely extending tubular element 54 in a manner which defines a manifold through which gaseous fuel such as propane can be directed for combustion. A plurality of apertures 56 are provided along the upper surface 58 of the H-burner elements to provide an outlet for the fuel. Flames produced by the combustion of the fuel are laterally spread by an overlying array of flame spreader plates 60 that are spaced above the burner element upper surfaces 58 by appropriate spacer elements 62. Spreading of the flames in the foregoing manner prior to their passage through the perforated plate 49 or grating is desirable for simulating broadly spread fires of the type which can occur with fuel spills and the like.

Gaseous fuel is supplied to the H-burner 48 through a pipeline 64 that is connected to the fuel supply line 32 through a solenoid valve assembly 66. The fuel is delivered to the H-burner upon opening of the solenoid valve 66 in accordance with appropriate signal input received from the control console 24. However, the solenoid valve is of the type that is normally biased closed in order to prevent inadvertent or unwanted delivery of fuel to the burner.

The solenoid valve 66 is positioned downstream of a branch pipeline 68 that is mounted in fluid communication with the first fuel supply pipeline 64. The branch pipeline supplies gaseous fuel from the pipeline 64 to the point burner 46 in accordance with the orientation of a second solenoid valve 70 that is associated with the branch pipeline 68 upstream of the point burner. As is the case with the first solenoid valve 66, the second solenoid valve 70 is normally biased so as to close off the fuel flow passage within the associated branch pipeline 68 to the point burner. As will be described in greater detail below, solenoid valve 70 alone, or in combination with solenoid valve 66, can be based to an "open" position to permit fuel flow to the respective burners 46 and 48 in accordance with the class of fire (A, B or C) that is selected for simulation from the operator console.

Fuel passing through the branch pipeline 68 and solenoid valve 70 is delivered to an igniter assembly, designated generally by reference character 72 in FIG. 3. The igniter assembly 72 comprises a generally Y-shaped tubular structure 74 that defines a primary fuel flow passage 76 within which fuel from pipeline 68 is directed, and an auxiliary passage 78 within which is received a fuel igniter unit 80. The igniter unit 80 can be in the form of any suitable spark emitting device, such as the Model 1340-00 electrode assembly manufactured by Channel Products, Inc. of Chesterland, Ohio. Alternatively, the igniter unit 80 can be in the form of a pilot flame igniter. Preferably, the igniter unit is in the form of an electric spark igniter which is arranged with respect to the fuel flow passage so as to emit a spark within the center portion of the passage. The spark is generated from a high voltage electrical signal that is carried by a lead 81 from a suitable controller 82, such as the Series 05-30 controller manufactured by Fenwal Corp. of Ashland, Mass., and jumps the gap between a high voltage spark/sensor electrode 83 and a ground electrode 84. The spark is generated at a magnitude and frequency which assures ignition of the fuel passing through the fuel flow passage 76. While the separation distance between the electrodes 83 and 84 and the open end 86 of the gas pipeline 68 can vary in accordance with such factors as fuel pressure and the like, it has been found that optimal ignition results from a separation distance on the order of 2.0–3.5 inches (~5.0–8.75 cm) when the pipeline 68 is provided with an interior diameter of about 0.25 inch (~0.65 cm).

The point burner 46 is operable to simulate Class A and C fires, whereas the H-burner 48 in combination with the point burner 46 are collectively operable to simulate Class B fires. Selection of an appropriate class of fire to be simulated at the burner unit 22 is accomplished through appropriate input, such as the toggling of a switch (not shown) between Class A/C and Class B fires, at the control console 24. In accordance with the selected class of fire, solenoid 70 alone (for Class A or C fire simulation) or in combination with solenoid 66 (for Class B fire simulation) will open to permit the flow of fuel to the respective burners 46 and 48. For Class A and C fires, fuel to the point burner 46 is ignited within the igniter assembly 72 in the manner described above to produce a localized fire having flames which emanate from the burner 46. For Class B fires, fuel is supplied to both the point and H-burners 46 and 48, respectively, for combustion. However, fuel to the H-burner 48 is ignited passively within the burner element 54 as a result of exposure to the heat and flames from the point burner 46; no additional igniter assembly is required for operation of the H-burner. As a consequence of this burner arrangement, greater simplicity and reliability of operation can be achieved, as two burners can be operated through the use of a single igniter assembly. Flame propagation along the H-burner is enhanced by the flame deflectors 60, which serve to laterally spread the flames along the burner elements 50, 52 and 54, thereby enhancing not only burner performance but also the visual impact and realism of the simulation.

Figure 4A:
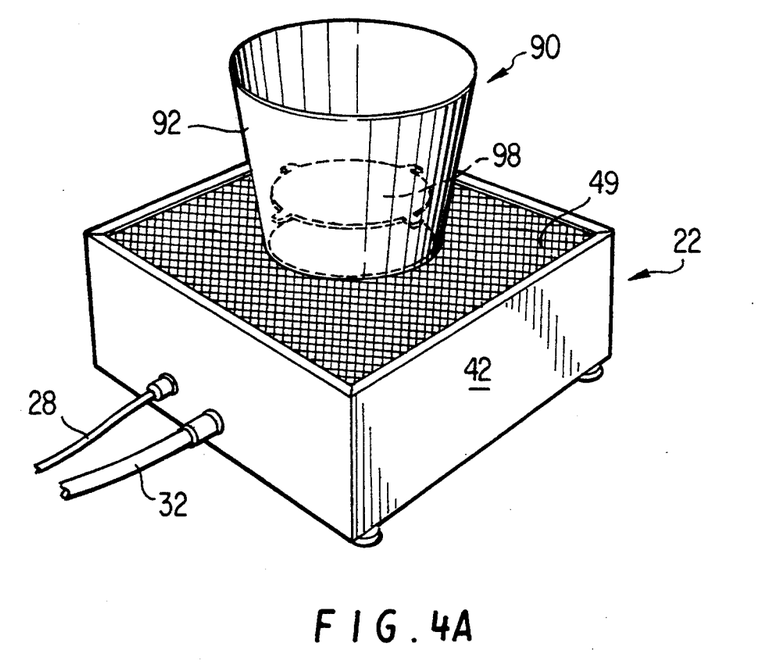
FIGS. 4A and 4B are perspective and overhead views, respectively, of a mock-up for use with the system depicted in FIG. 1.
Figure 4B:
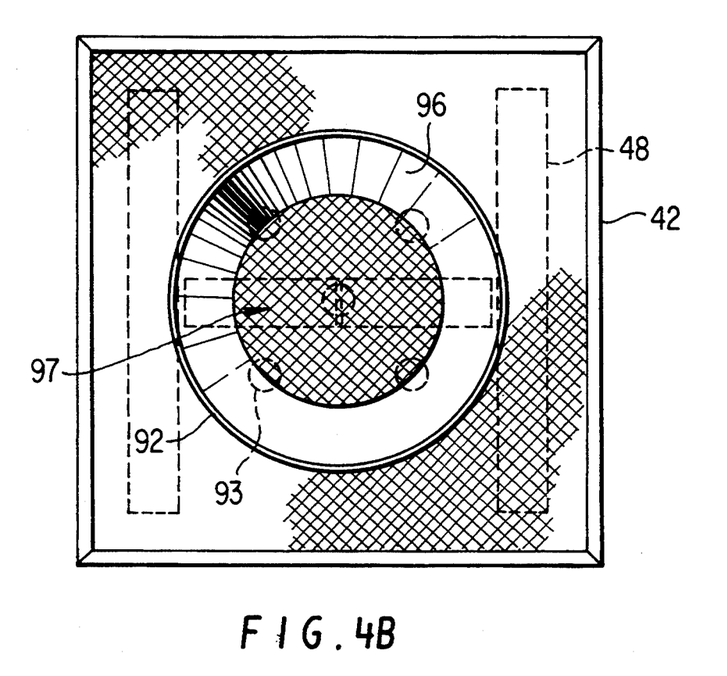

FIGS. 4A through 5B illustrate the configuration of various mock-ups of simulated structures that can be associated with the burner unit 22 to enhance the authenticity of the fire simulation. Each of the mock-ups is made of stainless steel or other suitable flame-resistant materials. With reference to FIGS. 4A and 4B, there is depicted a mock-up, designated generally by reference character 90, of a waste basket for simulating a Class A fire. The waste basket mock-up 90 provides a representation of a waste basket 92 which includes four, laterally spaced and downwardly-extending legs 93 that are receivable within correspondingly-dimensioned apertures 94 formed in standoffs 95 (FIGS. 2 and 3) mounted along the inside of the burner unit housing 42. Receipt of the mock-up legs 93 within the standoffs 95 stabilizes the mock-up throughout the training exercise. The waste basket 92 includes base 96 that defines an aperture 97 that is positioned above the grating 49 in overlying relation with the point burner 46 in order that flames generated by the point burner pass through the aperture 97 and up through the top of the waste basket 92. Preferably, the point burner 46 is operated at a fuel flow rate which results in the production of flames that extend beyond the open, upper end of the waste basket to further enhance the realism of the training scenario. A flame baffle 98 can optionally be provided inside the waste basket 92 above its aperture 97 to laterally spread the flames passing through the waste basket. A fire extinguishing agent can be applied to the fire from an extinguisher 40 (FIG. 1) or other suitable source until the fire and associated flames are extinguished. Fire extinguishment preferably results from suffocation, at which point the supply of gas to the point burner 46 is terminated by closure of the solenoid valve 70 in a manner that will be described in greater detail below.

Figure 5A:
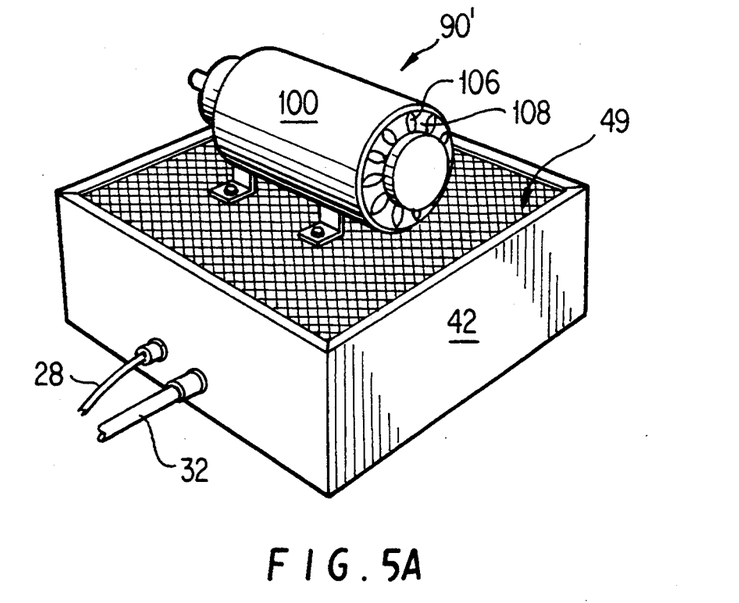
FIGS. 5A and 5B are perspective and overhead views, respectively, of an alternative mock-up for use with the system depicted in FIG. 1.
Figure 5B:
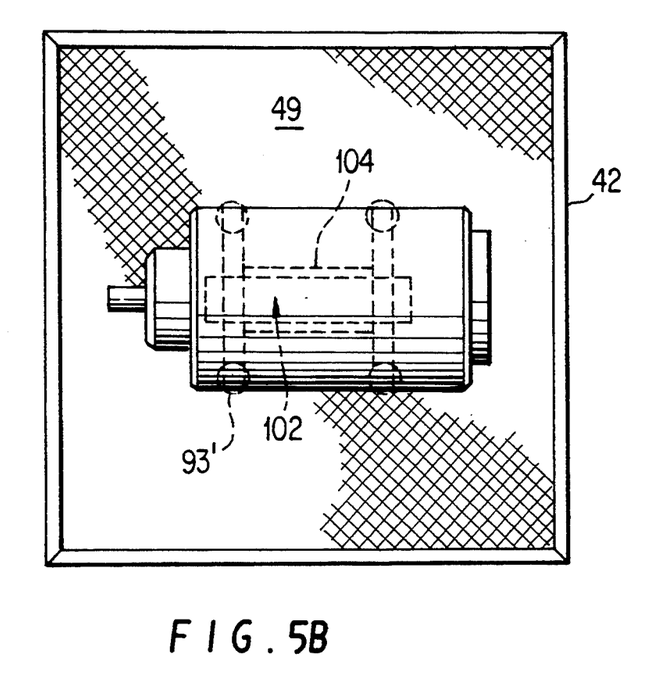

The mock-up 90' depicted in FIGS. 5A and 5B is in the form of an electrical motor or generator housing, designated by reference character 100, for the purpose of simulating a Class C fire. The housing 100 is mounted to the burner unit 22 in the same manner as was described above for the waste basket mock-up, with downwardly extending legs 93' being receivable within the standoffs 95 (FIGS. 2 and 3) of the burner unit housing. The housing 100 defines along its lower surface an aperture 102 which extends along the longitudinal axis of the housing through which flames generated by the point burner 46 can pass. A flame deflector plate 104 is mounted within the housing 100 parallel to its axis and above the aperture 102. The deflector plate 104 is operable to deflect the burner flames through apertures 106 formed in ends 108 of the housing. Firefighter trainees can apply a suitable fire extinguishing agent to the flames and to the apparent flame source within the housing 100 to suppress, and ultimately extinguish, the fire in the manner described above. While $CO_2$ is a preferred extinguishing agent, other suitable extinguishing agents include water, sodium bicarbonate, and the various other extinguishing agents discussed above. Non-biodegradable extinguishing agents, such as potassium bicarbonate and phosphorous potassium powder ("PKP"), can also be used with the present invention.

While two specific mock-ups 90 and 90' have been described above for simulating Class A and Class C fires, it is to be appreciated from the foregoing description that the present invention includes the concept of providing a set of different mock-ups for simulating Class A, B, or C fires. The mock-ups are preferably interchangeably mountable to the burner unit 22 in a manner, such as the arrangement of mock-up support legs 93 and 93' and burner unit housing standoffs 95 described above, which maintains their positions above the burner unit 22 in order that flames generated by one or both of the burners 46 and 48 can pass through the mock-up in a manner which simulates an appropriate class of fire.

Figure 6:
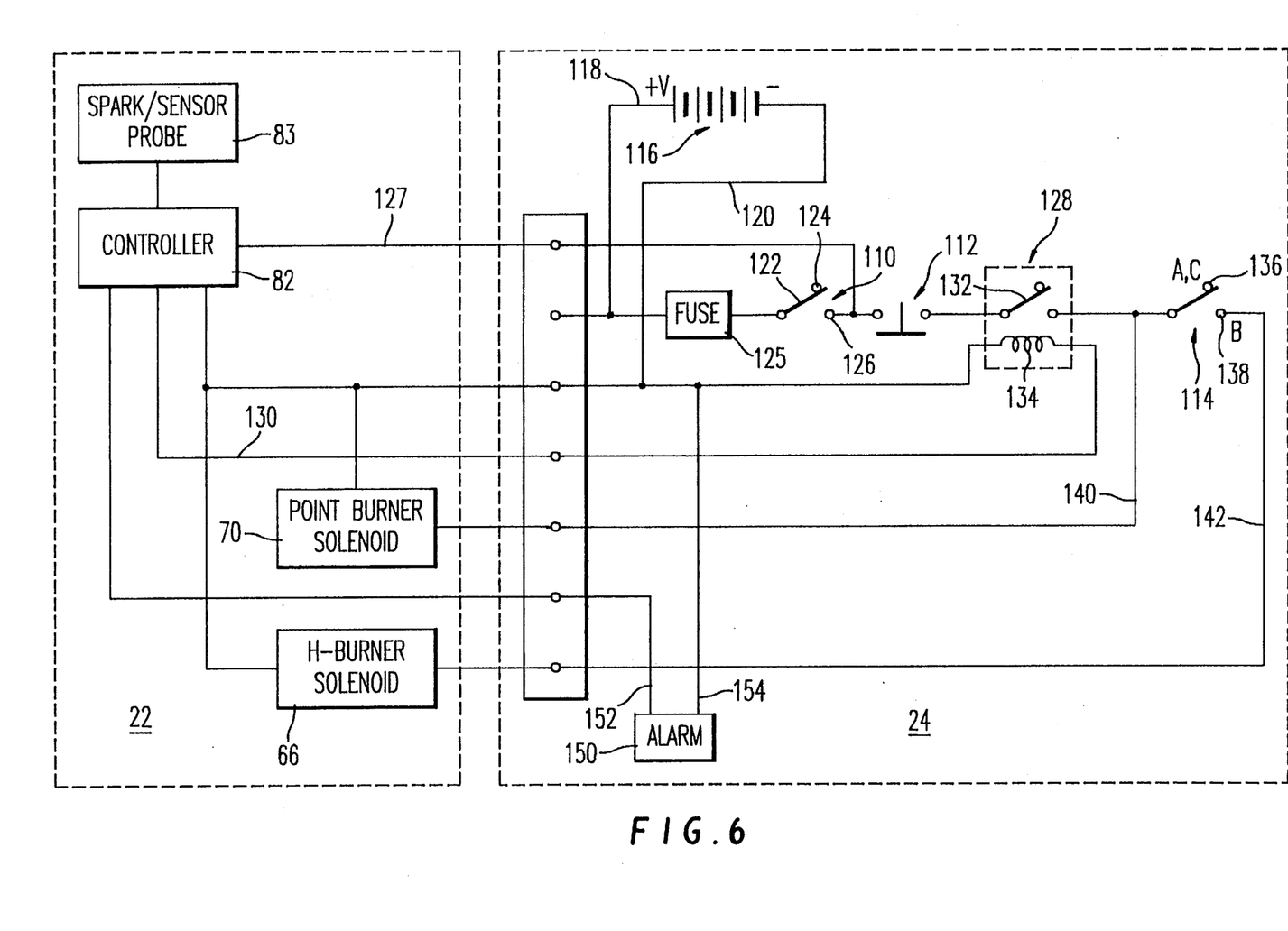
FIG. 6 is a schematic drawing of an electrical circuit for operating the system depicted in FIG. 1.

Details of an electrical circuit for controlling the portable firefighter trainer of the present invention are depicted in FIG. 6. The circuit elements referenced in the drawing figure are preferably housed within the console 24, with electrical leads extending to the various identified components located at the burner unit 22 through the electrical cables 28 (FIG. 1).

With concurrent reference to FIGS. 1 and 6, the electrical circuit includes a series arrangement of user-selectable controls, such as an ignition switch 110, an emergency stop button 112, and a fire class selector switch 114. Power for the circuit is preferably provided by an appropriate DC voltage source, such as a battery 116, although AC power can be substituted or provided for use as an alternate source of power in accordance with such factors as user preference, battery condition, and the like. Power from the battery is supplied to the circuit and its respective loads along positive and negative leads 118 and 120.

The ignition and fire class selector switches 110 and 114 are preferably in the form of toggle switches having a switch lever 122, as shown with respect to switch 110, that is selectively displaceable by a user between first and second switch contacts 124 and 126, respectively. Displacement of the ignition switch lever 122 to switch contact 124 breaks the circuit connection, whereas displacement to switch contact 126 closes the circuit to provide for activation, through the controller 82, of the spark igniter 80 (FIGS. 2 and 3) located at the burner unit. The circuit is preferably protected by an appropriate circuit breaker element or fuse 125. Power is supplied to the spark ignition controller 82 (FIGS. 2 and 3) along lead 127. Once spark generation has been implemented, the controller 82 directs a current through a relay 128 along lead 130 to effect opening of the solenoid 66 and/or 70 in accordance with the position of the fire class selector switch 114. The relay 128 is of conventional design and includes a switch 132 and a selectively-energizeable coil 134. Upon coil energization in the foregoing manner, switch 132 closes to permit current to pass from the battery to the appropriate solenoid(s) in the manner to be described below.

As described previously, the burners 46 and 48 are activated in accordance with the class of fire that is to be simulated. Fire class selection is accomplished by toggling the fire class selector switch 114 to the appropriate contact 136 or 138. Toggling to contact 136 allows for simulation of Class A and C fires by providing for an electrical signal input along lead 140 to the solenoid valve 70. Because solenoid valve 70 is normally biased in a closed position to prevent undesired fuel flow to the associated burner 46, the valve 70 is displaced to an open position upon receipt of the electrical signal input (and following toggling of the ignition switch 122 to the closed position), thereby enabling fuel flow to the burner 46. Toggling the selector switch 114 to switch contact 138 also provides for electrical signal input along lead 142 to the solenoid valve 66 that is associated with the H-burner 48, resulting in opening of the solenoid valve 66 (along with solenoid valve 70 in the manner described above) to enable fuel flow to the H-burner.

Upon activation of the ignition switch 110, electrical current is supplied to the controller 82 through lead 127, which causes the igniter 80 to generate a series of sparks to ignite fuel delivered in the manner described above to the point burner 46. Feedback from the igniter 80 is provided from the igniter electrode 83 (FIG. 3) to the controller 82 which monitors the burner unit 22 for the presence of a flame at the burner 46. The circuit is grounded through the point burner 46 to the battery 116 to provide a closed current loop that extends from the igniter 80, through the fire at the burner 46, and to the point burner 46. An audibly and/or visually perceptible alarm 150 is generated at the console as a result of signal output from the controller 82 along lead 152 in situations where the solenoid valves 66 and 70 have been closed due to the absence of a flame. The alarm is grounded through lead 154. As the alarm indicates a failure to obtain or maintain fuel ignition, the console operator can proceed to check various system operating parameters, such as fuel supply, battery condition, and the like, prior to attempting re-ignition. Once the fire has been ignited, the training scenario proceeds until either fire extinguishment by the trainee or termination, such as by way of the console operator's switching off of the ignition switch 110, or depressing the emergency stop button 112.

Although the present invention has been described with reference to a preferred embodiment, the invention is not to be construed as being limited to the details thereof. Various modifications and substitutions will be apparent to those of ordinary skill in the art, and all such modifications and substitutions are intended to fall within the spirit and scope of the invention as defined in the appended claims.

What is claimed is:

1. A portable firefighter training system comprising:
a portable fuel burner unit connectable to a supply of fuel by a flexible main supply line for selectively generating any one of a class A, class B, and class C training fire, the burner unit comprising
a burner unit housing including a flame outlet;
a burner manifold disposed adjacent to said outlet and selectively connectable to the main supply line by a first control valve for generating a class B fire,
a point burner disposed adjacent to said outlet and selectively connectable to the main supply line via a second control valve for generating a class A or class C fire,
a fuel ignition system operable to ignite fuel supplied to said point burner to produce a fire having flames, and
a fire detection sensor for detecting the presence of flame at an output of said point burner; and
a portable trainer control console connectable to said portable fuel burner unit for controlling fuel delivery to said fuel burner unit in response to said fire detection sensor and for controlling said fuel ignition system, said control console including a fire selector switch for selectively opening said second control valve for generating a class A or class C training fire, or said first and second control valves for generating a class B training fire.

2. The system of claim 1, wherein said fuel ignition system comprises a spark igniter.

3. The system of claim 1, further comprising a portable source of a fire extinguishing agent that can be applied by a trainee to the fire generated at said fuel burner unit.

4. The system of claim 3, wherein said extinguishing agent comprises a biodegradable fire extinguishing material.

5. The system of claim 3, wherein said extinguishing agent comprises $CO_2$.

6. The system of claim 3, wherein said extinguishing agent comprises water.

7. The system of claim 3, wherein said extinguishing agent comprises sodium bicarbonate.

8. The system of claim 1, further comprising at least one mock-up that is representative of a structure in which at least one of a Class A, B or C fire is to be simulated.

9. The system of claim 8, wherein said mock-ups are interchangeably mountable over said at least one burner element.

10. The system of claim 9, wherein operation of said burner manifold is slaved to operation of said point burner.

11. The system of claim 9, wherein said fuel ignition system comprises a single-igniter operable to combust fuel at said point burner and burner manifold.

12. The system of claim 1, wherein said fuel burner unit and said control console are configured as separate units.

13. The system of claim 1, further comprising a fuel storage tank containing a supply of propane.

14. The system of claim 13, wherein said supply fuel is natural gas that is received within a storage tank.

15. The system of claim 13, wherein said fuel is received within a storage tank that is capable of being transported and refilled.

16. A method of simulating fires for firefighter training comprising the steps of:

provid­ing a portable fuel burner unit including a burner unit housing having a flame outlet, a burner manifold disposed adjacent said outlet and connected to the main supply line by a first control valve, and a point burner disposed adjacent said outlet and connected to said main supply line via a second control valve;

providing a plurality of mock-ups;

connecting said burner unit to a supply of fuel by a main supply line;

positioning one from among said plurality of mock-ups on said burner unit, said mock-ups being representative of various fire class A, B or C structures in which a fire is to be simulated;

selectively opening said second control valve to supply fuel to the point burner for generating a class A or class C training fire, or opening said first and second control valves to supply fuel to both said point burner and burner manifold for generating a class B fire, operating a fuel ignition system to ignite fuel supplied to said point burner to produce said training fire;

monitoring the presence of flame at said point burner; and closing said first control valve when the flame at said point burner is extinguished.

* * * * *